US012700729B2

(12) United States Patent
Loziczky et al.

(10) Patent No.: US 12,700,729 B2
(45) Date of Patent: Aug. 4, 2026

(54) COMPUTER-IMPLEMENTED METHOD, NETWORK ANALYSIS ARRANGEMENT, AND COMPUTER PROGRAM PRODUCT

(71) Applicant: Siemens Aktiengesellschaft, Munich (DE)

(72) Inventors: Sebastian Loziczky, Vienna (AT); Martin Palkovits, Vienna (AT); Matej Rejc, Vienna (AT); Alexander Oman, Klosterneuburg (AT)

(73) Assignee: Siemens Aktiengesellschaft, Munich (DE)

( * ) Notice: Subject to any disclaimer, the term of this patent is extended or adjusted under 35 U.S.C. 154(b) by 331 days.

(21) Appl. No.: 18/439,218

(22) Filed: Feb. 12, 2024

(65) Prior Publication Data

US 2024/0275166 A1     Aug. 15, 2024

(30) Foreign Application Priority Data

Feb. 10, 2023     (EP) ..................................... 23156105

(51) Int. Cl.
  *H02J 3/00*       (2026.01)
  *H02J 3/001*      (2026.01)
  *H02J 3/38*       (2026.01)

(52) U.S. Cl.
  CPC .............. *H02J 3/001* (2020.01); *H02J 3/381* (2013.01)

(58) Field of Classification Search
  CPC .................................. H02J 3/001; H02J 3/381
  See application file for complete search history.

(56) References Cited

U.S. PATENT DOCUMENTS

| | | | |
|---|---|---|---|
| 6,987,331 B2 | 1/2006 | Koeppe et al. | |
| 2014/0074305 A1* | 3/2014 | Dzafic ..................... | H02J 3/003 |
| | | | 700/291 |

(Continued)

FOREIGN PATENT DOCUMENTS

| | | |
|---|---|---|
| CN | 100505474 C | 6/2009 |

OTHER PUBLICATIONS

Von Dzafic et al., "Real-Time Estimation of Loads in Radial and Unsymmetrical Three-Phase Distribution Networks", 2013 IEE 0885-8950.

(Continued)

*Primary Examiner* — Mark A Connolly
(74) *Attorney, Agent, or Firm* — Laurence A. Greenberg; Werner H. Stemer; Ralph E. Locher

(57) ABSTRACT

A computer-implemented method for a network analysis of an electrical energy network having at least one energy transmission network and at least one energy distribution network. The at least one energy transmission network has a higher rated voltage than the at least one energy distribution network. The method includes: determining a network state by use of a network analysis arrangement, taking into account a network partition data set, wherein the network partition data set provides an assignment of lines and/or equipment to the at least one energy transmission network and the at least one energy distribution network. Before a determination of the network state, by use of a network partitioning device based on a topology data set of the electric energy network, the electrical energy network is partitioned into the at least one energy transmission network and the at least one energy distribution network in the network partition data set.

15 Claims, 2 Drawing Sheets

(56)         References Cited

U.S. PATENT DOCUMENTS

| | | | | |
|---|---|---|---|---|
| 2016/0363918 A1* | 12/2016 | Einfalt | .................... | H02J 3/001 |
| 2023/0018146 A1* | 1/2023 | Henselmeyer | .......... | H02J 3/004 |
| 2023/0327438 A1* | 10/2023 | Kumar | .................... | H02J 3/003 |
| | | | | 700/286 |

OTHER PUBLICATIONS

HB Sun et al., Global state estimation for whole transmission and distribution networks, Jun. 15, 2004, pp. 187-195, Department of Electrical Engineering, Tsinghua University, Beijing 100084 China.

Zhang Ying et al: "Decentralized Coordinated State Estimation in Integrated Transmission and Distribution Systems", arxiv.org, Cornell University Library, 201 Olin Library Cornell University Ithaca. NY 14853, Nov. 8, 2021 (Nov. 8, 2021), XP091097105.

Spectrum Power 7 v2.30 SP2 Distribution Network Applications Application Sheet.

Liu Yikui et al.: "D-PMU based applications for emerging active distribution systems: A review", Electric Power Systems Research. Elsevier, Amsterdam, Nl, Bd. 179, Nov. 11, 2019 (Nov. 11, 2019), XP085943420, ISSN: 0378-7796, DO1: 10.1016/J.EPSR.2019. 106063.

Spectrum Power 7 v2.30 SP2 Transmission Network Applications Application Sheet.

Carlo Muscas et al., An efficient method to include equality constraints in branch current distribution system state estimation; EURASIP Journal on Advances in Signal Processing, 2015.

Von Dzafic et al., Real-Time Distribution System State Estimation., 2010 IEEE 978-1-4244-7398-4.

Intelligent control center technology—Spectrum Power. "DigitalSubstation_Whitepaper_EN".

Spectrum Power Aktives Netzwerkmangement, Siemens AG 2016, EMFG-B10104-00.

Primadianto Anggoro et al: "A Review an Distribution System State Estimation", IEEE Transactions on Power Systems, IEEE, USA, Bd. 32, Nr. 5, Sep. 1, 2017 (Sep. 1, 2017), Seiten 3875-3883, XP011659115, ISSN: 0885-8950, DOI: 10.1109/TPWRS.2016. 2632156.

* cited by examiner

COMPUTER-IMPLEMENTED METHOD, NETWORK ANALYSIS ARRANGEMENT, AND COMPUTER PROGRAM PRODUCT

CROSS-REFERENCE TO RELATED APPLICATION

This application claims the priority, under 35 U.S.C. § 119, of European Patent Application EP23156105.1, filed Feb. 10, 2023; the prior application is herewith incorporated by reference in its entirety.

FIELD AND BACKGROUND OF THE INVENTION

The present invention relates to a computer-implemented method according to the preamble of the independent method claim, a network analysis arrangement according to the preamble of the independent network analysis arrangement claim and a computer program product according to the independent computer program product claim.

Energy networks for electrical energy must be managed by means of a network control system, usually located in a network control center. Due to the increasing use of renewable energies such as wind turbines or solar energy systems, electrical energy networks must constantly become more flexible, easier to maintain and/or expandable. In addition, their operation should be optimized, for example by working closer to permissible limiting conditions for equipment during operation. The network should be controlled in such a way that transmission losses and bottlenecks and/or emergency measures are minimized.

In addition, the idea of so-called sector coupling requires more and more interfaces between the energy networks, for example for heat and gas, which have often been managed separately up to now.

The first generation of network control system software for the network control center was developed in the 1970s. It uses server computers specifically configured for this application that were installed in the computer room of the network operator's local control center. The server computers were typically redundantly configured to ensure that the availability of the network control system functionality was greater than 99.999%. In some cases, the redundant server computers are still installed in different locations today in order to make the entire system even more resilient and, for example, to ensure that even in the event of disasters such as earthquakes or fires at one location, control center functionality is maintained by means of the server computers at the other location.

The product brochure "Intelligent Control Center Technology-Spectrum Power", Siemens AG 2017, Article No. EMDG-B90019-00-7600, discloses software for a so-called "Supervisory Control and Data Acquisition (SCADA)" system for use in a control center. SCADA systems for the monitoring and control of energy networks have long been known (Wikipedia permanent link: https://en.wikipedia.org/w/index.php?title=SCADA&oldid=858433181). Readings from sensors, such as voltage meters and current meters in the energy network, are aggregated and transmitted to the control center. Control commands are sent to the energy network to control circuit breakers, step controllers of transformers, isolators and other controllable equipment in the energy network, as well as to control energy generators such as power plants. These control commands are received and processed by Remote Terminal Units (RTUs), programmable logic controllers (PLCs), and intelligent electronic devices (IEDs) to control the circuit breakers, isolators, etc. Up to now, a local data center has often been provided in the control center, on which the control center software, such as Spectrum Power, runs. The control center software is usually operated in a central computer arrangement, which can be configured, for example, as a data center with processors, data stores and display screens. The term "central" indicates that all measurement data from the energy network and all control commands for the energy network are processed centrally. Engineers are kept on standby at the control center around the clock, who can check the SCADA displays relating to the current operating state of the energy network and, in the event of a fault, can take countermeasures such as shutting down a network section.

The computer arrangement or the control center software can be partially or completely configured as a cloud application, i.e. a server arrangement with decentralized resources for data processing and data storage, which are connected via a data network such as the Internet.

As a side effect of an ever-increasing spread of distributed energy generation, for example through solar power systems or wind power plants, the ever more numerous local energy generators that feed into the low and medium-voltage network make it more difficult to determine the system state of the energy network. In particular, recording the current state in the lower voltage levels (medium and low voltage) is becoming ever more important because the networks in the lower voltage levels are more heavily loaded by the decentralized infeeds. In addition to the load profiles, infeed from wind and solar energy must now also be taken into account, for example. All these factors make it difficult not only to determine the current network state, but also to predict the future network state.

The dependence on weather conditions is growing, because e.g. solar cells are strongly influenced by cloud cover and wind turbines by the wind strength. These problems also feed back into the next voltage level above—an energy transmission network at the high-voltage level—which makes it more difficult to control and predict.

Until now, load and generation forecasts and/or schedules have generally been used in conjunction with a so-called "Distribution System Power Flow (DSPF)" to estimate a future network state. DSPF uses static equipment data, local energy consumption and energy generation forecasts, and dynamic topology information (i.e. which lines are currently connected between the individual components) to calculate a predicted voltage magnitude and voltage phase angle on each network section. On the one hand, a state estimation for the current state and on the other hand, a prognosis or network calculation for future states (e.g. load flows) can be made. The current state estimation also uses error-prone measurements as an input variable, but the estimate in the high-voltage network is over-determined. A load flow calculation works with schedules/forecasts and does not have overdetermined input data. The term "Now-cast" is sometimes used for "forecast" (e.g. wind forecasts) for the current state.

One approach is known, for example, from the product brochure "Spectrum Power Active Network Management", Siemens AG 2016, EMFG-B10104-00. The technical principles are known from the publications "Real-Time Distribution System State Estimation" by Dzafic et al., 2010 IEEE 978-1-4244-7398-4 and "Real-Time Estimation of Loads in Radial and Unsymmetrical Three-Phase Distribution Networks" by Dzafic et al., 2013 IEEE 0885-8950.

In addition, for monitoring and controlling energy distribution networks, in particular at the low-voltage level, so-called "Digital Substations" are used, i.e. substations with dedicated computing capacity for data acquisition and evaluation. The integration of such a substation into a SCADA system is known, for example, from the publication "Digital Substations with the Future Built In", Siemens AG 2017, Article No. EMDG-B10130-00-7600, from page 5.

The operating personnel in a control center for an electrical energy network need software for evaluating measurement data, so that a network state can be determined, for example, by means of a network analysis. For the typically meshed transmission network of the high-voltage or medium-voltage level, measurement data such as voltage, current level, active power, reactive power and, if appropriate, phase angles can be recorded for a plurality of measurement points. Often the measurement data is even available redundantly, so that a high accuracy and reliability of the measurement data is achieved.

In the distribution network on the other hand, which is typically assigned to the low-voltage level and in some cases also to the medium-voltage level, independent sub-networks with a radial structure are often provided, which are not comprehensively monitored with measuring devices. However, additional data from e.g. smart electricity meters (i.e. devices that can be read remotely via the Internet) can be taken into account.

Up to now, separate state estimations have been provided for the various sub-networks. For example, the brochure "Spectrum Power 7 v2.30 SP2 Transmission Network Applications Application Sheet" (hereafter referred to as TNA), Siemens AG 2021, AS-TNA-EN, Edition 07.2021, describes software for data collection in a transmission network and for controlling this transmission network. The lower-level distribution network with a lower rated voltage is not taken into account there, i.e. no interactions with this network are taken into account.

In addition, the brochure "Spectrum Power 7 v2.30 SP2 Transmission Network Applications Application Sheet" (hereafter referred to as DNA), Siemens AG 2021, AS-DNA-EN, Edition 07.2021, describes software for data collection in a distribution network and for controlling this distribution network. The higher-level distribution network with a higher rated voltage is not taken into account in this, i.e. no interactions with this network are taken into account.

Essentially, these provide operators of network control centers with various options for capturing networks at the distribution level and the transport or transmission level for a state estimation.

On the one hand, only TNA or DNA can be used at a given time to observe the distribution network or the transmission network individually.

On the other hand, both software products, DNA and TNA, can be used together. However, this has the disadvantage that both products use different data models and are not synchronized with each other. Accordingly, a control center technician obtains a separate result from each of the tools, in which interactions of the networks at different voltage levels are largely ignored.

A network analysis of an electrical energy network typically begins with a state estimation, on the basis of which power flows are calculated. Further aspects such as optimum power flows, fault detection (actual or potential limit violations of electrical quantities) and countermeasures, fault location, etc. can be calculated.

In the meantime, initial approaches have become known to considering transmission networks and distribution networks jointly for a network analysis, so that operators in a control center no longer need to switch between the use of different software solutions. This has the additional advantage that interactions between the different voltage levels can be taken into account for the state estimation. For example, switching operations can thus be monitored and safely performed, consistently across the lower-level sub-networks and the higher-level transport network or transmission network.

For example, the publication "Global state estimation for whole transmission and distribution networks" by Suna and Zhanga, published in 2005 in "Electric Power Systems Research 74", pages 187-195, is known. This assumes a fixed separation between one or more distribution networks and a transport network. In reality, this case only occurs if the topology of the networks remains unchanged during operation and, for example, transfer points between the networks always remain the same.

SUMMARY OF THE INVENTION

Starting from the known computer-implemented method for network analysis, the object of the invention is that of specifying a computer-implemented method with which a state estimation with improved accuracy is possible even in the event of dynamic changes in the network topology in the electrical energy network.

The invention achieves this object by way of a method as claimed in the independent method claim.

With the foregoing and other objects in view there is provided, in accordance with the invention, a computer-implemented method for a network analysis of an electrical energy network having at least one energy transmission network and at least one energy distribution network. The at least one energy transmission network has a higher rated voltage than the at least one energy distribution network. The method includes determining a network state by means of a network analysis configuration, taking into account a network partition data set. The network partition data set provides an assignment of lines and/or equipment to the at least one energy transmission network and the at least one energy distribution network. A partitioning of the electrical energy network into the at least one energy transmission network and the at least one energy distribution network in the network partition data set before a determination of the network state, by means of a network partitioning device based on a topology data set of the electrical energy network.

With the foregoing and other objects in view there is provided, in accordance with the invention, a network analysis configuration for a network analysis of an electrical energy network having at least one energy transmission network and at least one energy distribution network. The at least one energy transmission network has a higher rated voltage than the at least one energy distribution network. The network analysis configuration includes a state estimation device for determining a network state, taking into account a network partition data set. The network partition data set provides an assignment of lines and/or equipment to the at least one energy transmission network and the at least one energy distribution network. A network partitioning device is provided and configured to provide, before a determination of the network state, based on a topology data set of the electric energy network, a partitioning of the electric energy network into the at least one energy transmission network and the at least one energy distribution network in the network partition data set.

An essential advantage of the invention is that, unlike the current situation where only a static separation of the distribution network and transmission network or transport network can be processed for a common state estimation of the energy network, changes in the topology that occur during ongoing operation, i.e. dynamic changes, can also be considered. For example, the topology of the energy network changes dynamically when two low-voltage distribution networks (e.g. in Austria a maximum of 400V) are interconnected to form a single distribution network by closing a switch between two radial branches of the respective distribution networks. According to the invention, by means of the network analysis arrangement it is now possible to determine a partitioning of the network into distribution and transmission networks before each state estimation for the entire system, which increases the accuracy of the state estimation.

As a result, the method according to the invention is used to determine an energy transmission network and one or more energy distribution networks and to define transfer points between the energy networks.

The same principle of a dynamic partitioning of the overall energy network according to voltage levels (DNA and TNA) can also be advantageously used for a more rigorous network analysis for determining optimal power flows and/or fault detection and/or fault location. This only requires a uniform data model to be used for the transmission network and the distribution network, which reduces development effort and update requirements. The uniform data model can be based, for example, on the international CIM standard IEC 61970-301-1. As adaptations to the application for the invention, the standard can be extended to the effect that abstract classes are combined, exotic classes of no significance for the network analysis according to the invention are omitted, and types for dynamic results are added.

Furthermore, the uniform data processing according to the invention improves the observability of the network and, as a result, the network management as well as predictive calculations for the network. This reduces the number of emergency measures required.

For example, for the state estimation a network state of the higher-level energy transmission network can be determined first by means of software for "transmission system state estimation" (TSSE). This network state of the energy transmission network can be used as an input in the form of so-called "pseudo-measurements" for a "distribution system state estimation" (DSSE) in order also to determine the network state of the subordinate energy distribution networks. In this way, state estimation methods optimized for the respective voltage level can be used with both TSSE and DSSE.

Previously there was a risk that the DSSE software may not converge to a network state for some distribution networks or distribution network regions. Another advantage of the invention in this case is that a converged network state for the transmission network can be determined independently of this. The same applies to other distribution networks, since their network state estimation is calculated independently.

A computer-implemented method within the meaning of the invention is a sequence of steps that are implemented in software or application-specific hardware and can be processed automatically or semi-automatically by a computer. If the steps are implemented in software, in a compiled (i.e. machine-executable) form they form a computer program product. The computer program product can be executed on a computer, for example, a computer with a processor, a graphics card, input means for data and commands, and a display device such as a monitor and a data memory such as a hard disk (SSD, HDD). In this context, the term arrangement or network analysis arrangement refers to one or more computers which are designed to carry out the computer program product.

For example, the network analysis arrangement can be a system of computers in a network control center—where state estimates of the energy networks to be controlled are typically required. Alternatively, it may be entirely or partly a cloud system in which the software is used in one or more data centers with a plurality of data storage and data processor resources that are connected via a data communications network such as the Internet. Software can be used in a modular fashion as a so-called cloud application, where sufficient data processor and/or data storage resources are available. This ensures high scalability and availability. In addition, for many companies this essentially eliminates the need to operate or maintain in-house server computers or hardware on a large scale, including protection against hacker attacks. In addition, network control systems must be dimensioned in such a way that they can process extremely large volumes of data, such as those generated by faults in the energy network, without data loss. This means that the computing resources are only partially utilized during normal operation, which is both economically and ecologically inefficient.

The network analysis arrangement within the meaning of the invention is designed to operate control center software, with which measurement data and switching states of the energy network are received and further processed, and control commands derived from these for controllable equipment such as switchgear, stepper switches of transformers, network controllers, controllable electrical energy consumers, controllable producers of electrical energy, capacitor banks, etc. are sent. In this way, the energy network is monitored and controlled, e.g. in order to keep the network voltage and the network frequency within the permitted limits. Based on the network state, control commands are written to avoid faults in the energy network and to increase network availability. The aspect of controlling the energy network can also be performed by a separate control arrangement, i.e. a classical network control system, in conjunction with the network analysis arrangement.

Devices within the meaning of the invention are components of the above-mentioned arrangement designed in software or hardware, which can each perform one or more steps. For example, these could be individual computers or servers, each with comparable data storage and data processor resources as described above for the cloud infrastructure.

An energy network has, for example, a low-voltage electrical energy supply network, which has a maximum rated voltage of e.g. 400V, as well as a medium-voltage network with a maximum nominal voltage of e.g. 20 kV. This can be considered to be an energy distribution network within the meaning of the invention.

If multiple low-voltage networks or medium-voltage networks are present, these are also referred to as distribution network sub-networks. The low-voltage energy network is connected, for example, via a transformer, to the medium-voltage network, which in turn is connected to a high-voltage network for energy transmission with a rated voltage of more than 20 kV. Within the meaning of the invention, high-voltage networks are referred to as energy transmission networks, wherein there may be more than one transmission sub-network. Meshed, fully observable network regions are referred to as energy transmission networks within the meaning of the invention. This usually applies to high-voltage networks and sometimes also to parts of the medium-voltage network.

A network analysis of an electrical energy network comprises, for example, a state estimation so that the stability of the energy network and the occurrence of faults can be monitored. A fault is, for example, a violation of permissible voltage limits (e.g. more than +/−10% of the nominal voltage). A deviation from the nominal network frequency (usually 50 Hz) can also constitute a fault. Current limits or power limits may also be violated.

The network partition data set is implemented, for example, as a file or database which stores an assignment of lines and/or equipment to the at least one energy transmission network and the at least one energy distribution network.

For example, a topology data set of the electrical energy network provides information on the structure and interconnection of the entire energy network. This may include information on the interconnection of lines, generators, consumers, transformers, network controllers, protective devices, switching devices, measuring instruments for voltage, current magnitude, and phase angles. Measured values at the measurement points of the measuring instruments can also be included, e.g. voltage, current and phase angle.

In a preferred embodiment of the computer-implemented method according to the invention, the network state provides at least one of the following items of information about the energy network: state estimation, power flows, optimized power flows, analysis of faults and countermeasures, detection of fault locations in the energy network. This is an advantage because the network state can be used to control electrical energy generators (e.g. power plants), consumers and controllable equipment (e.g. switching devices, transformers and network controllers) in order to keep the network stable and free of faults.

In addition, a so-called "redispatch optimization" can be performed.

In a further preferred embodiment of the computer-implemented method according to the invention, the topology data set describes the electrical energy network using edges as electrical lines and nodes as generators and/or loads. This is a particularly simple description of a topology, as the connections between the components are highlighted as a key factor. Transformers and/or shunts may also be described in the topology data set.

In another preferred embodiment of the computer-implemented method according to the invention, network regions in the energy network are identified by means of the network partitioning device based on the topology data set, in such a way that for each network region, lines and/or loads and/or generators with a rated voltage below a pre-determined threshold value for the rated voltage are assigned to a preliminary energy distribution network, and lines and/or loads and/or generators with a rated voltage above the pre-determined threshold value for the rated voltage are assigned to a preliminary energy transmission network. This is an advantage because a simple preliminary assignment to the different voltage levels can be made. The preliminary energy transmission network is then either assigned to the energy transmission network or a new energy distribution network is created in the data set.

For example, a maximum voltage of 20 kV can be used as a pre-determined threshold.

A level of observability can be chosen as a further criterion for partitioning the energy network. The part of the network that is typically designed for a transmission network, i.e. has a higher voltage level, a meshed structure and full observability with measuring devices for current, voltage and/or phase angle, is identified as an energy transmission network. Typically, there is one energy transmission network per electrical network region; as there is usually only one electrical network region there is only one energy transmission network. Network regions are electrically connected. In contrast, electrical islands are not electrically connected. This means that the electrical sub-networks and/or network regions are identified within the electrical islands.

The parts of the network that have typical distribution network characteristics such as medium- and low-voltage levels, partial non-observability, radial structure or presence of current measurement data and other different input data (pseudo-measurements, historical data, load/generation curve data) are identified as distribution subsystems (usually there are multiple distribution subsystems in the energy distribution network). Optimized algorithms can be used for each of these two characteristic subsystem types. Therefore, a transmission network state estimator for transmission subsystems and a distribution system state estimator for distribution subsystems are used.

In a further preferred embodiment of the computer-implemented method according to the invention, the preliminary energy distribution network is verified as an energy distribution system based on at least one assessment criterion, wherein the at least one assessment criterion contains at least one of the following assessment criteria: number of busbars, number of loads, number of sequential subdivisions or branches, minimum electrical resistance of branches in the preliminary energy distribution network, number of radial branches, rated electrical voltage, number of available measurements. Radial branches within the context of the invention refer to sequentially connected branches. This is an advantage because the preliminary assignment to the different voltage levels can be confirmed using assessment criteria.

For example, a threshold value for the number of busbars in the energy distribution network may be set to 5. The minimum number of loads can be 1. The minimum electrical resistance of branches in the preliminary energy distribution network can be set to 0.5 0. A minimum number of sequential sub-divisions or branches can be set to 3. For example, a minimum number of available measurements may include a current measurement or a combination of an active power measurement and a reactive power measurement.

In another exemplary embodiment for a Spanish energy network, the following parameter set was shown to be suitable for network partitioning using the approach according to the invention:

a maximum voltage of 20 kV in the distribution network, at least 5 busbars, at least 1 load, minimum electrical resistance of branches in the preliminary energy distribution network: $0.5\Omega$ (can be ignored as a criterion in the specific example in Spain), at least 3 sequential branches, and at least 1 current measurement or a combination of active power and reactive power.

In the example, the voltage for the basic classification is relatively low at 20 kV. This can vary for other networks and can be up to 52 kV, for example.

For example, the global state estimation algorithm runs as follows.

1) A transmission system state estimator (TSSE) is used to resolve the transmission subsystems.

2) The results of the TSSE at the transfer points are used as pseudo-measurement input for the state estimator of the distribution system.

3) A distribution system state estimator (DSSE) is used for the distribution subsystem.

The respective algorithms are optimized for the respective subsystem type.

In addition to the optimized algorithms, the custom partitioning also has the advantage that if the DSSE does not converge for some distribution subsystems, this does not negatively affect the convergence of the transmission subsystem or other distribution subsystems, since these are calculated independently.

An alternative workflow can be used to synchronize the calculation of the transmission and distribution subsystem.

The result of the network divider are transmission and distribution subsystems and transfer points that connect them.

The TSSE algorithm for transmission system state estimation (TSSE) is used to estimate the current network situation in a transmission subsystem.

A transmission subsystem is characterized by the following features:

a) Large number of measuring devices
 b) Redundant measurements
 c) Observable network
 d) Meshed network The TSSE has been designed to deliver the best estimates on the basis of the measurements provided by the SCADA system (Supervisory Control and Data Acquisition). It uses an observability check to determine subsystem regions that require additional (pseudo-)measurement information to be correctly estimated. In this case, values are used that are determined by means of schedules.

At its core, the TSSE uses a Newton-Raphson algorithm to calculate the complex voltages in the subsystem. For this purpose, a system of equations is set up, in which each equation represents the measurement and its effects on the voltages in the subsystem. A matrix representation can be specified as follows:

$$\begin{vmatrix} \text{Matrix with dependencies of} \\ \text{the measured values on the} \\ \text{different voltages} \end{vmatrix} \begin{vmatrix} \text{Voltages} \end{vmatrix} = \begin{vmatrix} \text{Measurement values} \end{vmatrix}$$

This system of equations is used by the TSSE to minimize deviations between the measurements and the current solution. This is effected with the following steps:

1. Initialize voltages to starting values;
 2. Determine matrix and delta measurement vector;
 3. Solve the equation system to update the various voltages; and
 4. If update values are less than a pre-determined threshold value, a solution is obtained, otherwise proceed to step 2.

To allow different measurements to have different effects on the solution (e.g., a power measurement has less effect than a voltage measurement), the TSSE uses weighting factors to increase or decrease the effects of the measurements. These weights are determined using standard deviation values that describe how accurate the measurement is.

In short, the TSSE uses a Newton-Raphson algorithm with a node voltage state variable (vector) to solve a least squares optimization problem. However, other algorithms for a TSSE or a DSSE can also be used in the context of the present invention and are advantageously used with the described network partition algorithm.

The algorithm for estimating the distribution system (DSSE) is formulated in the same way as the procedure for the TSSE. The problem is also formulated in the DSSE as a least-mean-square optimization problem and solved using a Newton-Raphson algorithm. However, instead of using node voltages, branch currents are used as state variables. In addition, pseudo-measurements, e.g. for loads, are used as a fallback solution to ensure observability. In this case, load values from historical data and/or load curves are scaled. In the algorithm, these pseudo-measurements are less trusted than real SCADA measurements from the field (higher sigma).

In order to calculate zero injections and other constraints efficiently, Lagrange multipliers were added to the equation system. This approach is known, for example, from the publication "An efficient method to include equality constraints in branch current distribution system state estimation" by Muscas et al., EURASIP Journal on Advances in Signal Processing, 2015. For each distribution subsystem, the DSSE can be calculated independently of the others. Therefore, the calculations can be parallelized to increase performance.

In real systems, it is common for individual distribution subsystem calculations not to converge. Since they are divided into individual independent subsystems by the network divider beforehand, this does not affect the rest of the system, in particular the convergence of the transmission subsystem. This robustness to the non-convergence of individual distribution subsystems is a major advantage of the network divider and the combination of algorithms described above.

Synchronization of transmission and distribution calculations at the transfer points can be performed in two ways:

1. Top-down approach: first the transmission network is calculated, then the results at the transfer points are used as input in the form of pseudo-measurements for the calculation of the distribution network subsystem. This approach is the fastest and is sufficient for most use cases.
 2. Iterate the calculations of the transmission and distribution subsystems until the resulting difference at the transmission points is below a pre-determined threshold.

With regard to the aggregation of low-voltage measurements (e.g. rated voltage 400 V) and, if applicable, other data and their consideration in the present method, it should be noted that these types of information have so far typically not been taken into account for a state estimation of the entire network. To take these types of data into account, they can be aggregated. They can then be used as equivalent infeeds for a network model (e.g. with rated voltages of 10 kV or 30 kV in Europe). The following steps can be used for this:

Providing measured values or calculated or estimated measured values (based on reference values, load curves, historical values, etc.).

Combining in a topologically correct manner (e.g. all measured values of a low-voltage section) to determine a corresponding equivalent infeed, wherein additional information on the type of infeed or load is passed in (e.g. photovoltaic, hydropower, wind power, type of load, etc.).

Scaling to the current, possibly measured, value at the start of the infeed section, taking into account the aforementioned types of infeeds or loads.

Using the scaled values as pseudo-measurements for the state estimation of the distribution network.

The following text describes how the approach of the invention can be used in the low-voltage range.

As soon as the necessary information such as static and dynamic data on electrical parameters, topology, electricity meter data, real-time measurement data is available in sufficient quality, the calculation of high-voltage transmission networks and medium-voltage distribution networks described above can be transferred to the low-voltage range. By means of the described method for network partition, it is possible to identify which parts of the entire network are low-voltage networks. These can then be handled using a method for state estimation for low-voltage networks, whereby either deterministic methods, stochastic methods or artificial intelligence can be used.

Furthermore, the principle of dividing the entire network into multiple voltage levels or sub-networks can also be used in such a way that algorithms optimized for the respective voltage level are used for a power flow calculation. For example, a branch current can be calculated in the distribution network because this algorithm can evaluate long radial structures.

Similarly, the partitioned overall network can be analyzed in terms of one of the following aspects: optimized power flow, fault analysis, fault location detection, optimized redispatch.

In a further preferred embodiment of the computer-implemented method according to the invention, at least one technical constraint is taken into account for the identification of electrical network regions, wherein the technical constraint comprises at least one of the following constraints: minimum number of edges, at least one generator and at least one load.

In another preferred embodiment of the computer-implemented method according to the invention, the network state is updated within a specified period of time, with the network partition data set being updated beforehand in each case. This aspect is an essential advantage of the invention, because it enables the network state to be calculated based on the current topology. For example, the specified time period is one hour, wherein the update can be performed at regular intervals within the hour. The update is preferably performed at least every 10 minutes.

Starting from known arrangements for network analysis, a further object of the invention is that of specifying an arrangement with which a state estimation with improved accuracy is possible even in the event of dynamic changes in the network topology in the electrical energy network.

The invention achieves this object by means of a network analysis arrangement. Preferred embodiments are derived from dependent claims, wherein the same advantages apply, mutatis mutandis, as explained at the beginning for the computer-implemented method according to the invention.

Starting from the known computer program products for network analysis, a further object of the invention is that of specifying a computer program product with which a state estimation with improved accuracy is possible even in the event of dynamic changes in the network topology in the electrical energy network.

The invention achieves this object by means of a computer program product. The same advantages as those described above for the computer-implemented method according to the invention apply mutatis mutandis.

Other features which are considered as characteristic for the invention are set forth in the appended claims.

Although the invention is illustrated and described herein as embodied in a computer-implemented method, a network analysis arrangement, and a computer program product, it is nevertheless, not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
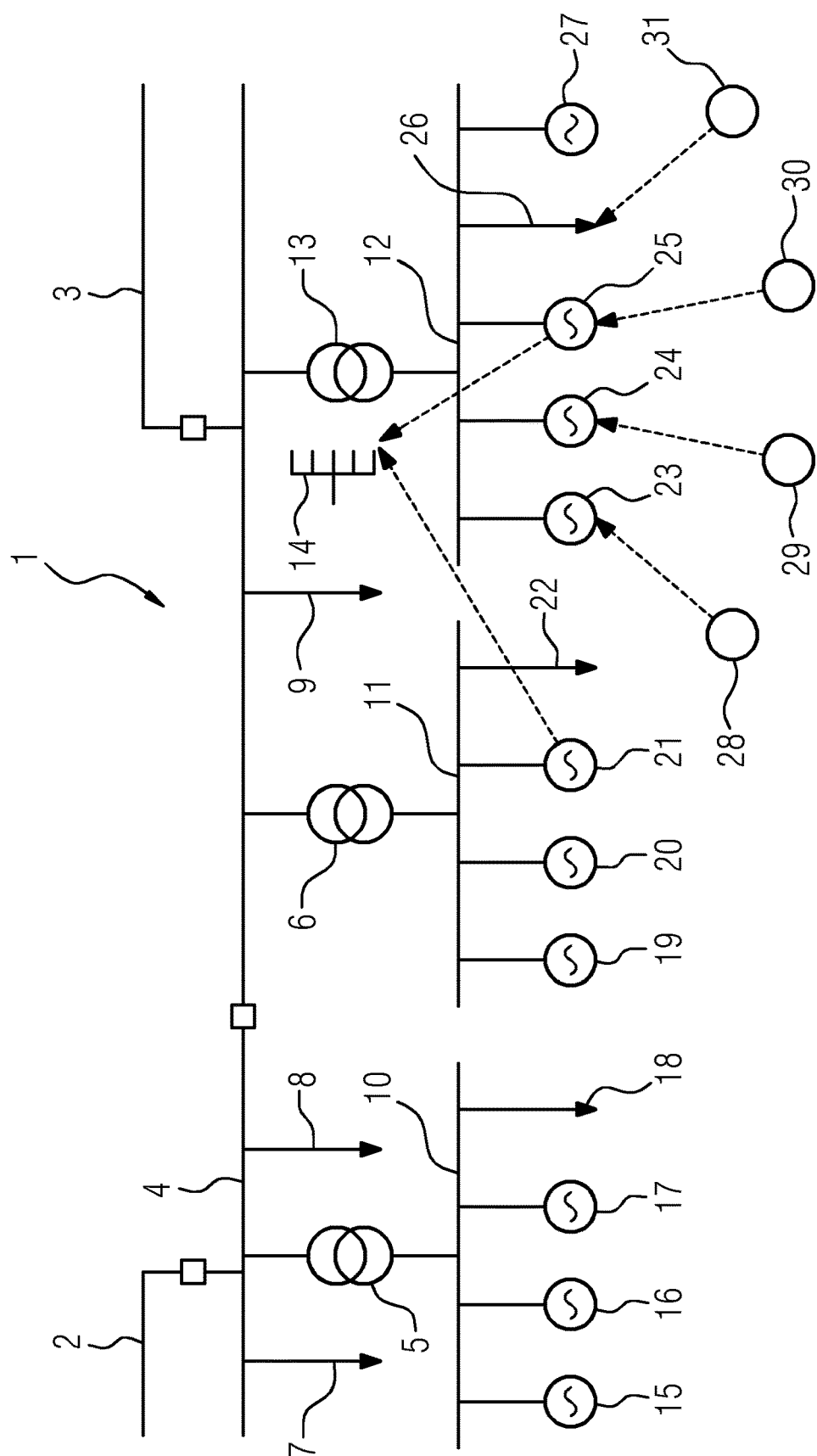
FIG. 1 is a schematic illustration of an exemplary embodiment of an electrical energy network according to the invention.

Referring now to the figures of the drawings in detail and first, particularly to FIG. 1 thereof, there is shown a first exemplary embodiment of an electrical energy network 1. FIG. 1 shows three feeders (transformers) from the medium-voltage network to the low-voltage network. FIG. 1 illustrates the possible aggregation of the low-voltage data for use in the distribution network state estimation. Medium-voltage lines 2, 3 are connected to a medium-voltage network 4 with a rated voltage of 10 kV to 30 kV.

A complete network is not shown, as there are no high-voltage lines present. The radial feeders in the medium voltage go from one station to the next (the lines 2,3 are connected to the next station in each case). As an example, such a station with its feeders to the low-voltage level is shown in more detail.

The medium-voltage network 4 has multiple feeders 7, 8, 9. A load can be measured on the feeder 7. A notional load is assumed on the feeder 8. The same applies to the feeder 9, but here multiple known factors 14 have been aggregated: a load, a photovoltaic infeed, a wind power infeed, and a hydropower infeed. A transformer 5, which leads to a low-voltage level 10 with a rated voltage of 0.4 kV, is located on a further feeder. A photovoltaic system 15, a wind turbine 16, a hydroelectric plant 17 and a load 18 are connected to the low-voltage network 10. On another feeder there is a transformer 6, which leads to a low-voltage network or sub-network 11. In turn, a photovoltaic system 19, a wind turbine 20, a hydroelectric plant 21 and a load 22 are connected to this low-voltage network 11. A further feeder 9 has a low-voltage network 12 connected to it, to which a photovoltaic system 23, a wind turbine 24, a hydroelectric plant 25 and a load 26 and other generators or consumers 27, not specified in detail, are connected. To determine the electrical parameters of the infeed systems or the loads 23 to 26, bottleneck capacities and/or reference measurements 28, 29, 30, 31 are taken into account.

Figure 2:
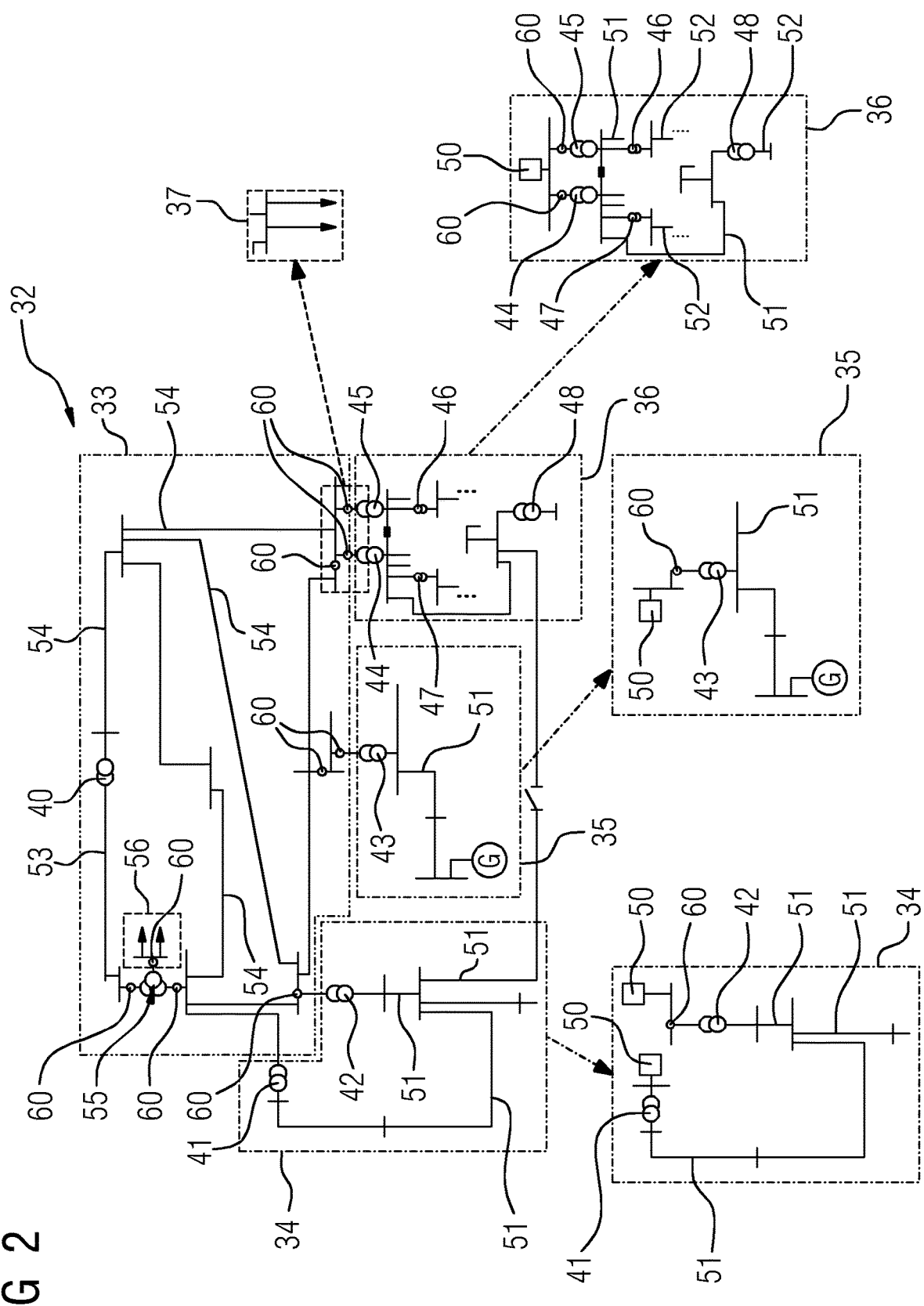
FIG. 2 is a schematic illustration showing an exemplary embodiment of a partitioned energy network according to the invention.

FIG. 2 shows an exemplary embodiment of an energy network 32 partitioned according to the invention. An energy transmission network 53 of the high voltage level with a rated voltage of 220 kV to 400 kV is connected via transformers 40, 55 to a high-voltage network 54 with a rated voltage of 110 kV. Measurement devices are each indicated with the reference sign 60. The high-voltage network 53 may be connected to another high-voltage network at connection point 56, which would require a calculation using state estimators optimized for transmission networks. If at connection point 56, however, a connection is made to a low-voltage level, this section would be subsequently allocated to a distribution network. According to the invention, the present energy network 32 is divided into sub-networks using the proposed algorithm. In this case, a transmission network 33 is first isolated from the high-voltage networks 53, 54. This can be fed to a state estimation using suitable transmission network algorithms. Via transformers 41, 42, 43, 44, 45, the transmission network 33 is connected to a series of medium-voltage networks 51. For example, these medium-voltage networks are operated with 35 kV or 10 kV. Taking into account the topology or open switch positions, it is possible according to the invention to divide the present medium-voltage network 51 into multiple sub-networks 34, 35, 36 and to further calculate these separately. For example, the distribution network subsystem 34 is calculated separately, so that at the infeed points 50 or the contact points to the higher-level transmission network 33, equivalent infeeds for the state estimator used on the transmission network level can be transmitted. The distribution network subsystem 35 is handled in the same way. In the distribution network subsystem 36 it can also be seen that a low-voltage network 52 is connected below the medium voltage level 51 via the transformers 46, 47, 48. This has a rated voltage of e.g. 0.4 kV.

The basic idea of this network separation is to supply the sub-networks to a state estimation separately and to use the results as equivalent infeeds on the respective transformer. The network below a transformer, i.e. at the lower voltage level, is treated as a uniform sub-network if, in the further course of the topology of the network, two transformers establish a connection at any point. This can be effected, for example, via a common busbar or via another connection at the low-voltage or medium-voltage level.

The invention claimed is:

1. A computer-implemented method for a network analysis of an electrical energy network having at least one energy transmission network and at least one energy distribution network, wherein the at least one energy transmission network has a higher rated voltage than the at least one energy distribution network, which comprises the steps of:

determining a network state by means of a network analysis configuration, taking into account a network partition data set, wherein the network partition data set provides an assignment of lines and/or equipment to the at least one energy transmission network and the at least one energy distribution network; and partitioning the electrical energy network into the at least one energy transmission network and the at least one energy distribution network in the network partition data set before the determination of the network state, by means of a network partitioning device based on a topology data set of the electrical energy network.

2. The method according to claim 1, wherein the network state provides at least one of the following information items about the electrical energy network: state estimation, power flows, optimized power flows, analysis of faults and countermeasures, and detection of fault locations in the electrical energy network.

3. The method according to claim 1, wherein the topology data set describes the electrical energy network using edges as electrical lines and nodes as generators and/or loads.

4. The method according to claim 3, which further comprises identifying electrical network regions in the electrical energy network by means of the network partitioning device based on the topology data set, such that for each electrical network region, the electrical lines and/or the loads and/or the generators with a rated voltage below a pre-determined threshold value for the rated voltage are assigned to a preliminary energy distribution network, and the electrical lines and/or the loads and/or the generators with a rated voltage above the pre-determined threshold value for the rated voltage are assigned to a preliminary energy transmission network.

5. The method according to claim 4, wherein the preliminary energy distribution network is verified as an energy distribution system based on at least one assessment criterion, wherein the at least one assessment criterion contains at least one of the following assessment criteria: number of busbars, number of loads, number of sequential subdivisions or branches, minimum electrical resistance of branches in the preliminary energy distribution network, number of radial branches, the rated voltage, and number of available measurements.

6. The method according to claim 4, wherein at least one technical constraint is taken into account for an identification of the electrical network regions, wherein the at least one technical constraint contains at least one of the following constraints: minimum number of edges, at least one generator and at least one load.

7. The method according to claim 1, which further comprises updating the network state within a specified time period, wherein the network partition data set has been previously updated.

8. A network analysis configuration for a network analysis of an electrical energy network having at least one energy transmission network and at least one energy distribution network, wherein the at least one energy transmission network has a higher rated voltage than the at least one energy distribution network, the network analysis configuration comprising:

a state estimation device for determining a network state, taking into account a network partition data set, wherein the network partition data set provides an assignment of lines and/or equipment to the at least one energy transmission network and the at least one energy distribution network; and a network partitioning device configured to provide, before the determination of the network state, based on a topology data set of the electric energy network, a partitioning of the electric energy network into the at least one energy transmission network and the at least one energy distribution network in the network partition data set.

9. The network analysis configuration according to claim 8, wherein said state estimation device is configured to configure the network state to provide at least one of the following information items about the electrical energy network: state estimation, power flows, optimized power flows, analysis of faults and countermeasures, and detection of fault locations in the electrical energy network.

10. The network analysis configuration according to claim 8, wherein the topology data set describes the electrical energy network using edges as electrical lines and nodes as generators and/or loads.

11. The network analysis configuration according to claim 10, wherein said network partitioning device is configured to identify electrical network regions in the electrical energy network based on the topology data set, such that for each electrical network region, the electrical lines and/or the loads and/or the generators with a rated voltage below a pre-determined threshold value for the rated voltage are assigned to a preliminary energy distribution network, and the electrical lines and/or the loads and/or the generators with a rated voltage above the pre-determined threshold value for the rated voltage are assigned to a preliminary energy transmission network.

12. The network analysis configuration according to claim 11, wherein said network partitioning device is configured, to verify the preliminary energy distribution network as an energy distribution system based on at least one assessment criterion, the at least one assessment criteria containing at least one of: number of busbars, number of loads, number of sequential subdivisions or branches, minimum electrical resistance of branches in the preliminary energy distribution network, number of radial branches, the rated voltage, and number of available measurements.

13. The network analysis configuration according to claim 11, wherein said network partitioning device is configured, to take at least one technical constraint into account for an identification of the electrical network regions, the at least one technical constraint containing at least one of the following constraints: minimum number of edges, at least one generator and at least one load.

14. The network analysis configuration according to claim 8, wherein the network state is updated within a specified time period, wherein the network partition data set is previously updated.

15. A non-transitory computer readable medium, comprising:

computer executable instructions which during execution on a computer, cause said computer to implement the method according to claim 1.

* * * * *